United States Patent [19]
Greenwood et al.

[11] Patent Number: 6,044,431
[45] Date of Patent: *Mar. 28, 2000

[54] DATA BUFFER USING DUMMY DATA

[75] Inventors: Jonathan Mark Greenwood; Michael John Ludgate, both of Basingstoke, United Kingdom

[73] Assignees: Sony Corporation, Tokyo, Japan; Sony United Kingdom Limited, Weybridge, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,771

[22] Filed: Apr. 9, 1997

[30] Foreign Application Priority Data

Apr. 12, 1996 [GB] United Kingdom .................... 9607643

[51] Int. Cl.$^7$ ....................................................... G06F 12/00
[52] U.S. Cl. ................................ 711/5; 711/109; 711/165; 365/221; 365/219; 395/821
[58] Field of Search ..................................... 365/221, 219, 365/189.01, 54; 711/109, 165; 395/821

[56] References Cited

U.S. PATENT DOCUMENTS 3,824,551 7/1974 Arciprete et al. .
5,343,451 8/1994 Iizuka ......................................... 369/32
5,388,074 2/1995 Buckenmaier ...................... 365/189.05
5,552,833 9/1996 Henmi et al. ............................ 348/460
5,646,700 7/1997 Park ........................................ 348/718

FOREIGN PATENT DOCUMENTS 1 454 290 11/1976 United Kingdom .
2 231 694 11/1990 United Kingdom .

OTHER PUBLICATIONS

Inside Macintosh, "Imaging With Quick Draw" pp. A–3 to A–6 and 1–19 to 1–20 and 4–13 to 4–16,Mar. 1994.

Primary Examiner—John W. Cabeca
Assistant Examiner—Mehdi Namazi
Attorney, Agent, or Firm—Frommer Lawrence & Haug, LLP.; William S. Frommer

[57] ABSTRACT

Data buffering apparatus comprises a data memory in which input data are written to the memory in contiguous groups at memory addresses defined by a write pointer and data are read from the memory at a memory address defined by a read pointer; and means for writing a dummy group of data at the end of at least some of the input data groups, the dummy groups of data being read from the memory and discarded before a subsequently written input data group is read.

11 Claims, 6 Drawing Sheets

| f1 | f2 | f3 | f4 | f5 | f6 | f7 | f8 | P | f1' | f2' | f3' | f4' | f5' | f6' | f7' | f8' | P | f1" | f2" | f3" | ... |

*Fig. 4*

DATA BUFFER USING DUMMY DATA

BACKGROUND OF THE INVENTION

1. Field of the Invention

This invention relates to data buffers and to data storage or processing apparatus comprising one or more data buffers.

2. Description of the Prior Art

Data that has been retrieved from a storage medium or which is to be transmitted in some way often has to be "buffered" or temporarily stored in an electronic memory. Commonly, a "first-in-first-out" (FIFO) memory is used for this purpose, so that the buffered data is read out in the order in which it was received by the buffer memory.

One previously proposed type of FIFO is a dual-port memory having a read pointer and a write pointer that rotate through the memory as data is written in or read out. An example of this type of FIFO is the NEC UPD42280GU-30 integrated circuit FIFO memory.

However, a feature of this FIFO design is that the read pointer and the write pointer must never be allowed to meet (i.e. to point to the same address within the memory), or even to come within a minimum addressing offset of, say, 200 bytes. If the pointers do meet, data can be lost.

The pointers could meet if all of the buffered data in the FIFO was read out before more data was written into the FIFO. This could happen if there is a delay in the data retrieval or processing which loads data into the FIFO.

One way of avoiding the possibility of the read and write pointers meeting in normal operation is to use a larger FIFO and to buffer a larger amount of data than would otherwise be necessary. However, this requires more hardware (i.e. the larger FIFO itself) and, more importantly, imposes a greater delay on the data being buffered because (a) the data may be held for a longer time in the FIFO; and (b) more data has to be loaded into the FIFO before the buffered data can start to be read out.

SUMMARY OF THE INVENTION

This invention provides data buffering apparatus comprising:

- a data memory in which input data are written to the memory in contiguous groups at memory addresses defined by a write pointer and data are read from the memory at a memory address defined by a read pointer; and
- means for writing a dummy group of data at the end of at least some of the input data groups, the dummy groups of data being read from the memory and discarded before a subsequently written input data group is read.

The invention recognises that the minimum read-write pointer offset which is present in many buffer memories (e.g. FIFOs) can force the user to buffer unnecessarily large amounts of data, and can also prevent the reading of the data last-written to the memory before the next group or packet of input data is stored.

The invention addresses this problem by providing means for writing dummy data into the memory after a group of input data, so that all of the input data can be read out as soon as required. The dummy data maintains the minimum offset between the memory read and write pointers, but is then read and discarded before the next "real" (input) group of data is read from the memory.

Thus, the dummy data is generated by the buffering apparatus itself; it does not need to form part of the input data stream.

In order to make it more straightforward to read and discard the dummy data, it is preferred that the dummy group of data comprises a pre-defined quantity of data.

Preferably the input groups of data and the dummy groups of data comprise identification data (which may be, for example, at a pre-defined data position within the groups) to distinguish an input group of data from a dummy group of data. For example, the identification data may comprise a data header written to the memory before the remainder of the corresponding group of data. In this case, it is preferred that the apparatus comprises means for detecting whether a group of data read from the memory is a dummy group of data and, if so, for initiating reading of the next-stored group of data from the memory.

The invention is particularly useful where each input group of data comprises video data (e.g. compressed video data) representing one or more video pictures, or audio data. The dummy groups may be written, for example, after each input group or alternatively at the end of a burst sequence of input groups.

This invention also provides data storage/retrieval apparatus comprising:

- data buffering apparatus as defined above;
- a data storage device; and
- means for reading groups of data from the data storage device and storing the retrieved groups as input groups in the data buffering apparatus.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 4 is a schematic diagram illustrating the format of data stored in the memory of FIG. 3;

DESCRIPTION OF THE PREFERRED EMBODIMENTS

Figure 1:
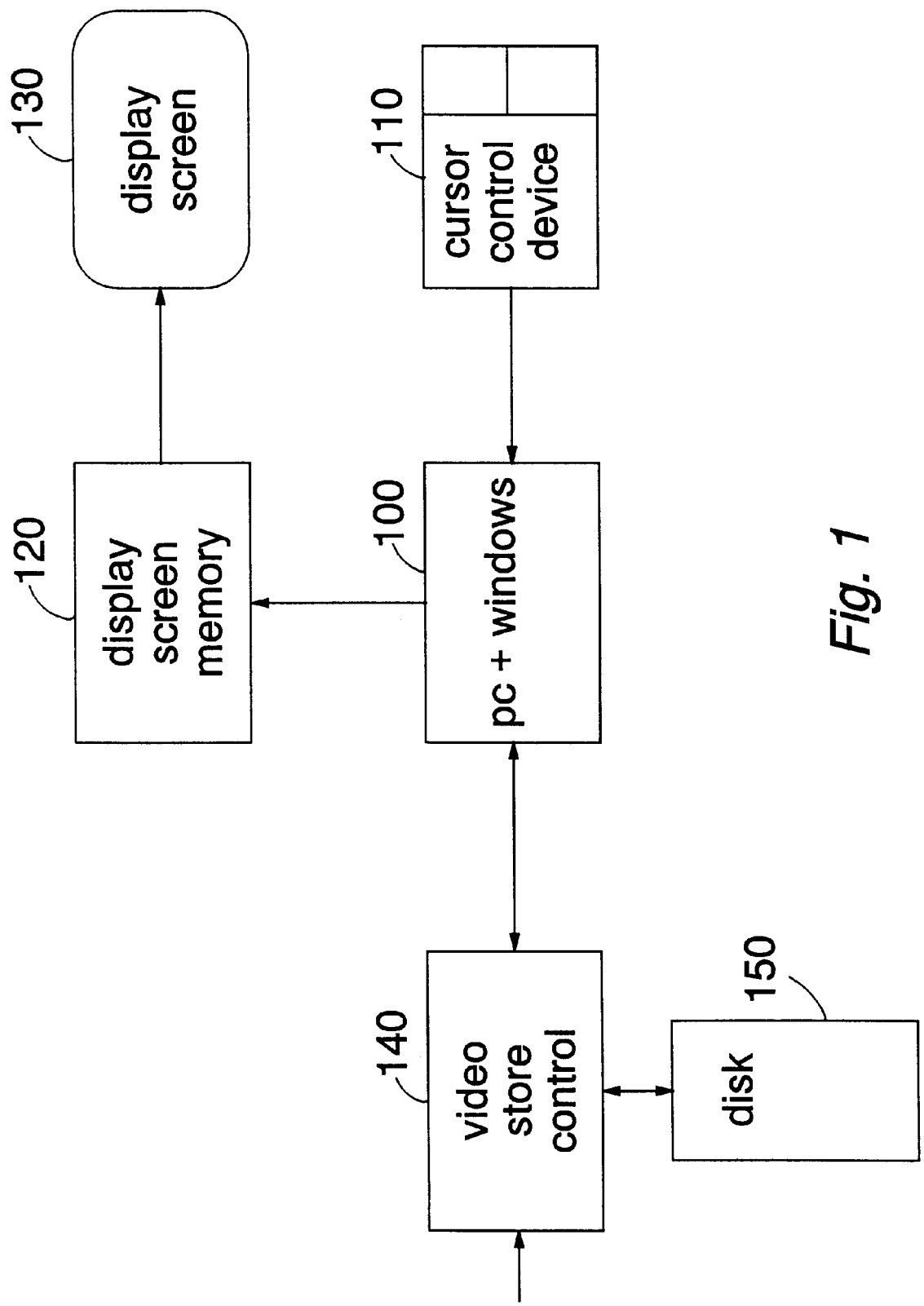
FIG. 1 is a schematic diagram of a digital video editing system.

FIG. 1 is a schematic block diagram of a digital video editing system and associated video storage apparatus.

The system comprises a personal computer (PC) 100, the PC having a cursor control device 110 (e.g. a mouse), a display screen memory 120 and a display screen 130. The PC in the present embodiment is a notebook (portable) computer, the IBM "Thinkpad", in which the PC 100, the cursor control device 110, the video display screen memory 120 and the display screen (an LCD screen) are all incorporated into a single portable unit. (In actual fact, the cursor control device 110 in the IBM Thinkpad is a joystick control device.) Thus, data communication between the PC and its constituent parts is via the PC's internal buses.

The PC 100 also communicates with a video store controller 140 via a SCSI bus, and the video store controller 140 also communicates with a magneto-optical disk 150 (referred to in this description as an "HS" (Hyper Storage) disk because the disk used in this embodiment is marketed by Sony under the product code "HS") via a SCSI bus.

In the present embodiment, the video store controller 140 and the magneto-optical disk 150 are fabricated as a "docking station" on which the notebook computer may sit in use.

The editing system is intended to act as an off-line non-linear edit controller, in which incoming audio and video signals are subjected to very heavy data compression (to a level well below broadcast standard) and are stored on the magneto-optical disk 150. (The incoming video signals may be full-rate, i.e. uncompressed, or may already be compressed to a broadcast quality level of compression such as the "MPEG 2 4:2:2 P@ML" compression standard of about 10:1 compression). When one or more sections of source video have been stored on the magneto-optical disk 150, they can be manipulated by the user operating the edit controller to generate an edit decision list (EDL) which is a list of video time codes defining "in-points" and "out-points" of the source material to form successive portions of an output edited video sequence. However, because the video signal stored on the disk 150 are well below broadcast standard, the EDL is exported and is then applied to the original video data as supplied to the video store controller 140 for broadcast or distribution.

This description deals primarily with the replay of the compressed video and the audio data from the HS disk.

Figure 2:
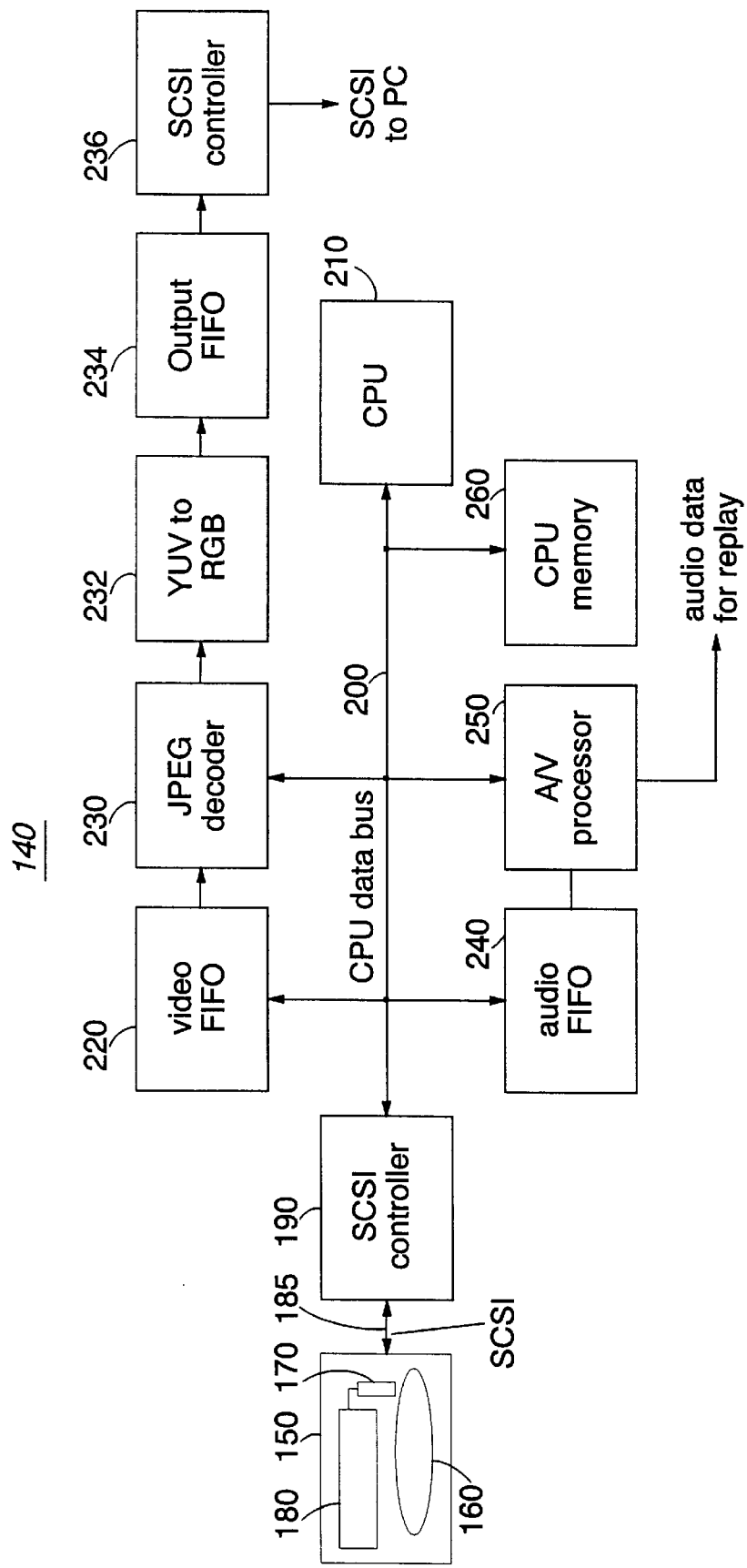
FIG. 2 is a schematic diagram of a video store controller and associated disk store.

FIG. 2 is a schematic diagram of a part of the video store controller 140 and the magneto-optical disk 150. The disk 150 is a self-contained unit with a removable disk medium 160, containing the read/write heads and associated circuitry 170, and a processor 180 which attends to the very low-level formatting and data handling on the disk. An example of such a product is the Sony HSD-650 magneto-optical disk drive. With this device, the disk 150 is supplied (from external circuitry) with a "logical block address" (LBA) defining one of a large number of logical data blocks on the disk. The actual positioning and formatting of the blocks on the disk medium 160 is left to the processor 180, so that the disk 150 appears to the outside as a large (in this case, 652 Megabytes) storage medium on which small blocks of storage are individually addressable by the LBAs. The disk 150 communicates with the remainder of the video store controller via a SCSI controller 190.

The SCSI controller 190 and several other components to be described below are connected to a CPU data bus 200 under the control of a CPU 210. The other components connected to the CPU data bus 200 are a video FIFO 220, a JPEG decoder 230, an audio FIFO 240, an A/V processor 250 and a CPU memory 260.

During a replay operation, video data is read from the HS disc 150 and is then communicated via a SCSI bus 185 to the SCSI controller 190. Then, under the control of the CPU 210, frames of video data are communicated via the CPU data bus to the video FIFO 220 and are then read out one at a time by the JPEG decoder 230. The JPEG decoder 230 outputs decompressed video frames for transmission to the PC 100 for display. These are in fact passed to a YUV to RGB converter 232 (which is actually formed as part of the same application specific integrated circuit (ASIC) as the A/V processor 250, but which is illustrated schematically as a separate functional unit in FIG. 2) and then to an output FIFO before being transmitted to the PC via a further SCSI controller 236.

The HS disc 150 also stores associated audio data on a frame-by-frame basis. The audio data is read out from the HS disc 150 and transmitted from the SCSI controller 190 to the audio FIFO 240 via the CPU data bus 200. The audio data is then read out by the A/V processor 250 and is replayed in synchronism with the displayed video pictures, via a loudspeaker or headphone socket output (not shown).

FIG. 2 shows the apparatus in a replay mode only. In a complementary recording mode, the operation takes place basically in reverse, in that the JPEG decoder 230 operates in a complementary manner as a JPEG encoder to encode video frames for temporary storage in a further (record mode) video FIFO (not shown) before being written to the HS disc 150. Similarly, audio data supplied to the A/V processor 250 is formatted for storage and held temporarily in a further (record mode) audio FIFO (not shown) before being written to the HS disc 150.

Figure 3:
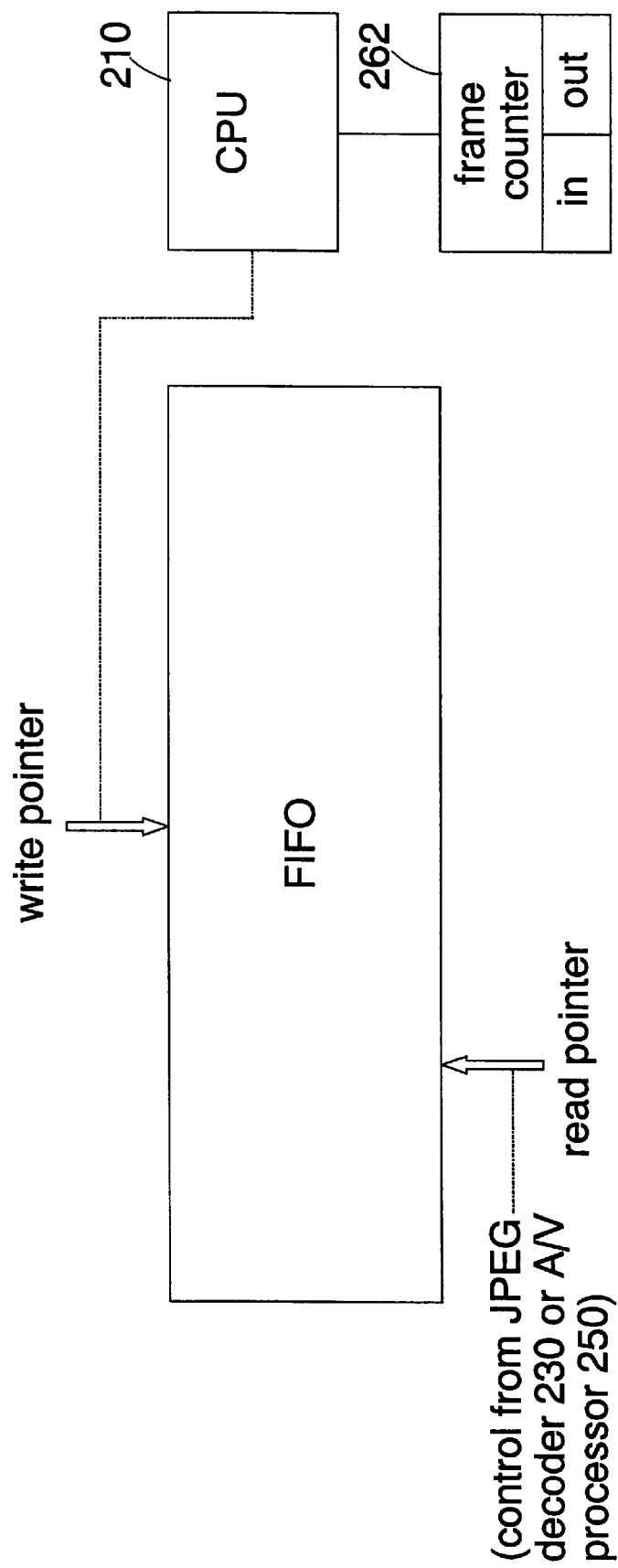
FIG. 3 is a schematic diagram of a first-in-first-out memory.

FIG. 3 is a schematic diagram of a FIFO of the type used for the video FIFO 220 and the audio FIFO 240 of FIG. 2.

The FIFO of FIG. 3 represents a commercially available component, the NEC UPD42280GU-30 integrated circuit FIFO memory.

The FIFO operates as a two-port 256 kilobyte memory in which data is written into the memory at an address controlled by a write pointer and data is read from the memory at an address controlled by a read pointer. The write pointer is under the control of the CPU 210, and the read pointer is under the control of the JPEG decoder 230 and the A/V processor 250 (for the video FIFO) and the A/V processor 250 (for the audio FIFO), although reading operations by these devices are initiated by the CPU 210. A restriction in the operation of this particular FIFO device is that the write pointer and the read pointer must never approach one another in the FIFO address domain by less than a minimum offset of 200 bytes.

As well as controlling the write pointer and the read pointer, the CPU 210 also maintains a frame counter 262 in the CPU memory 260, which records the number of frames of video data or audio data (as appropriate) written into that FIFO and the number of frames read from the FIFO. Thus, at any time, the CPU 210 has a record of the number of currently un-read frames stored in the FIFO.

FIG. 4 is a schematic diagram illustrating the format of audio or video data stored in the respective FIFO.

Video or audio frames (as appropriate) are read from the HS disc 150 in groups of eight frames. These are stored sequentially in the respective FIFO 220 or 240. In FIG. 4, successive groups of eight frames are referred to as F1 . . . F8, F1' . . . F8', F1" . . . etc. The frames are then read out individually by the JPEG decoder 230 or the A/V processor 250 as appropriate. At the end of each group of eight frames, the CPU 210 writes a packet of "dummy" data into the FIFO, which will be referred to as "padding" data (P in FIG. 4).

Thus, the steps involved in transferring frames from the HS disc 150 to, for example, the video FIFO 220 are:

a) the CPU 210 controls reading of eight frames from the HS disc 150 to the SCSI controller 190 and then via the CPU data bus (as a direct memory access (DMA) transfer) to the video FIFO 220 where they are stored sequentially; and b) the CPU 210 controls a further DMA transfer via the CPU data bus 200 of a packet of padding data from the CPU memory 260 to the video FIFO 220, in which it is stored after the eighth frame of the group of frames just retrieved from the SCSI controller 190.

Thus, the padding data is not stored on the HS disk; it is simply generated by the data buffering apparatus of FIG. 2.

On replay, frames F1 to F8 are read out one at a time from the FIFO. Normally, the next group of eight frames (e.g. F1' . . . F8') is written into the FIFO well before the last frame of a current group is read out from the FIFO. However, if for some reason (e.g. access delays caused by the HS disc 150) the last frame F8 of a current group of eight frames has to be read out before the first frame F1' of the next group is written into the FIFO, then the presence of the padding data prevents the read pointer and the writer pointer of the FIFO from meeting. In particular, in this situation, the read pointer would remain at the end of frame F8 whereas the write pointer is at the end of the padding data P. (The padding data is arranged to be larger than the minimum offset required between the read and write pointers.)

When the next frame F1' is successfully stored and is to be read out from the FIFO, the padding data packet P is read out first and discarded, and then the frame F1' is read out and used. Thus, the padding data remains in the FIFO until there is at least one other frame of real data following the padding data, so that the read and write pointers do not meet. The presence of this next frame of real data is detected by the CPU with reference to the frame counter 262.

Figures 5A, 5B, 5C:
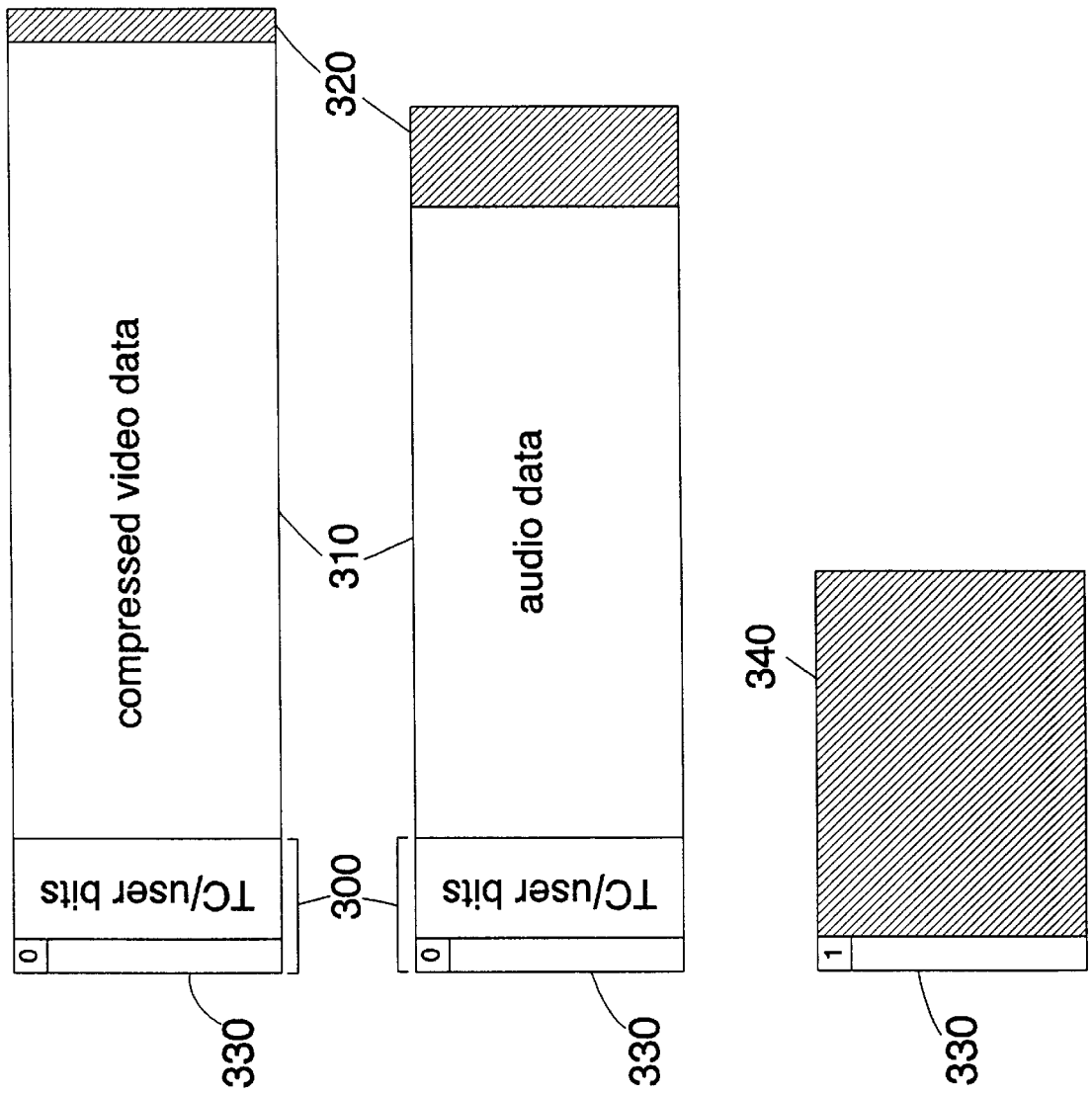
FIGS. 5a to 5c are schematic diagrams of a video data packet, an audio data packet and a padding data packet respectively.

FIGS. 5A, 5B and 5C are schematic diagrams of a video data packet, an audio data packet and a padding data packet respectively.

The video data packet (FIG. 5A) and the audio data packet (FIG. 5B) are similar in form, comprising a head portion 300, followed by a data portion 310 containing either compressed video data or appropriately formatted audio data, followed by a portion of dummy data 320 to bring the packet up to a required packet size. In the case of the video packet, the dummy data portion 320 is of variable length, to allow for slight variations in the JPEG encoding of the video data. In the audio data packet, the dummy data portion 320 is of a predetermined length.

A first byte 330 of the header portion 300 is used to define whether the packet is a real data packet (video or audio data) or a padding data packet. In particular, the most significant bit (MSB) of the byte 330 is set to logical "0" to indicate a real data packet and to logical "1" to indicate a padding data packet. The remainder of each header portion 300 stores time code and user-definable information.

The total length of a video data packet is about 6 kilobytes, of which about 32 bytes make up the header portion 300. The audio data packet has a similar header portion 300, but the total packet length is only about 3 kilobytes. These total lengths are pre-defined and are therefore constant from packet to packet, for a particular video line standard.

FIG. 5C schematically illustrates a padding data packet. In the padding data packet, the MSB of the header byte 330 is set to logical "0" to indicate that the data to follow represents a padding data packet. The remainder of the packet 340 comprises dummy data. The total length of a padding data packet (for both the audio and the video FIFOs) is pre-defined as being 1024 bytes plus the header 330.

Because the packet lengths for the video packet, the audio packet and the padding data packet are pre-defined, the correct amount of data can be read from the respective FIFO so that an entire packet is read in a single operation.

The reading operation to retrieve a frame of audio or video data from the audio or video FIFO respectively will differ depending on whether the frame to be read is the first frame in a group of eight frames (F1 etc) or another frame (F2 . . . F8). The reason for this difference is that before the first frame in a group of eight can be read, the preceding padding data packet P must be read and discarded.

Figure 6:
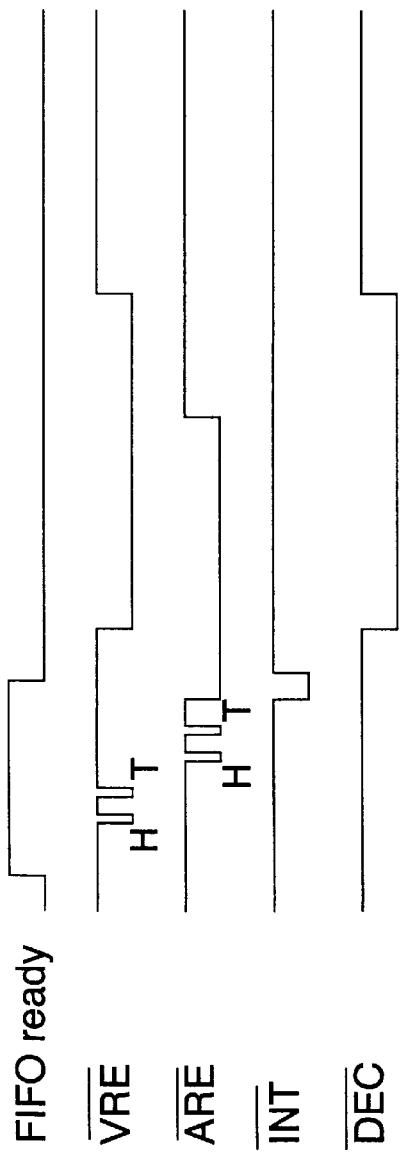
FIG. 6 is a schematic timing diagram of a video data packet reading operation.

FIG. 6 is a schematic diagram of a video data packet reading operation for one of frames F2 to F8, i.e. a frame which is not preceded by a padding data packet.

The reading process starts by a "FIFO-ready" signal being asserted by the CPU 210. This signal is transmitted to the JPEG decoder 230 and the A/V processor 250. The A/V processor 250 then asserts an active low read-enable signal VRE to read the header (H) and time code (T) information from the next video data packet stored in the video FIFO 220. Similarly, the A/V processor 250 asserts an active low read-enable signal ARE to read the header and time code information from the audio FIFO 240. As mentioned above, the header defines whether the data packet is a real data packet or a padding data packet. In the case of FIG. 6, it is assumed that the next packet is a real data packet.

Once the header and time code information has been read, the A/V processor 250 asserts a CPU interrupt signal INT. The INT signal causes the CPU to cancel the FIFO-ready signal, which in turn leads to the A/V processor cancelling the INT signal. Also, in response to the INT signal, the CPU 210 issues a command to the JPEG decoder 230 to read and decompress the packet of video data from the video FIFO 220. A signal DEC indicates the decompression operation taking place. The system then waits for the next FIFO-ready signal at the next frame boundary.

The A/V processor 250 reads the audio data packet in response to successful reading of the header and time code for that packet.

Figure 7:
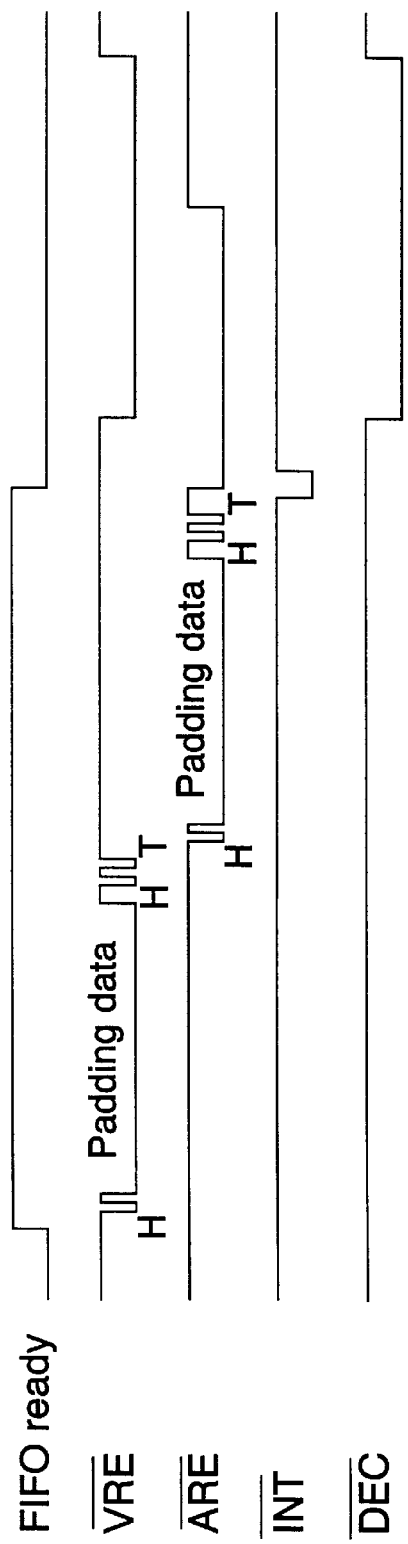
FIG. 7 is a schematic timing diagram of a padding data packet reading operation followed by a video data packet reading operation.

FIG. 7 is a schematic timing diagram showing the reading of a padding data packet followed by the reading of a video and audio data packet. Thus, this refers to the reading of the first real data packet in a group of eight.

Once again, the process is initiated by the CPU 210 asserting a FIFO-ready signal. The A/V processor then reads the header data H from the padding data packet P, and detects from the MSB of the header byte 330 that the following data packet is in fact padding data. The JPEG decoder 230 then reads and discards the fixed-length padding data packet, and then reads the header and time code information for the following real data packet.

Similarly, the A/V processor 250 reads the padding data packet header and then reads and discards the fixed-length padding data packet. It then reads the header and time code information for the following real data packet. Thereafter, the process continues as in FIG. 6.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Data buffering apparatus comprising:

a data memory in which input data are written to said memory in contiguous groups at memory addresses defined by a write pointer and data are read from said memory at a memory address defined by a read pointer; and logic for writing one packet of dummy data at the end of at least some of the input data groups, wherein said read pointer points to said dummy data stored in said data memory until a next data group is stored in said data memory so that said read pointer does not meet with said write pointer, and said dummy data being read out from said data memory in accordance with said read pointer and discarded before data included in said next data group is read from said data memory.

2. Apparatus according to claim 1, in which said data memory is a first-in-first-out memory.

3. Apparatus according to claim 1, in which said dummy group of data comprises a pre-defined quantity of data.

4. Apparatus according to claim 1, in which the input groups of data and said dummy groups of data comprise identification data to distinguish an input group of data from a dummy group of data.

5. Apparatus according to claim 4, in which said identification data comprises a data header written to said memory before the remainder of the corresponding group of data.

6. Apparatus according to claim 5, comprising means for detecting whether a group of data read from said memory is a dummy group of data and, if so, for initiating reading of the next-stored group of data from said memory.

7. Apparatus according to claim 1, in which each input group of data comprises video data representing one or more video pictures.

8. Apparatus according to claim 7, in which said input groups of data comprise compressed video data.

9. Apparatus according to claim 1, in which each input group of data comprises audio data.

10. Data storage/retrieval apparatus comprising:
   data buffering apparatus according to claim 1;
   a data storage device; and
   means for reading groups of data from said data storage device and storing the retrieved groups as input groups in said data buffering apparatus.

11. A video editing apparatus for editing video data stored in a storage medium, comprising:
   replay means for replaying said video data from said storage medium;
   memory means for temporally storing said video data and one packet of dummy data based on a write pointer, and for reading out said video data stored in said memory means based on a read pointer;
   data counting means for counting a frame number of remaining video data of said memory means;
   control means for controlling said write pointer and said read pointer to be used by said memory means based on said frame number detected by said data counting means, wherein said read pointer points to said dummy data stored in said memory means until a next data group is stored in said data memory so that said read pointer does not meet with said write pointer.

* * * * *